United States Patent
Krökel

(10) Patent No.: US 10,869,002 B2
(45) Date of Patent: Dec. 15, 2020

(54) VEHICLE CAMERA DEVICE FOR CAPTURING THE SURROUNDINGS OF A MOTOR VEHICLE AND DRIVER ASSISTANCE DEVICE FOR DETECTING OBJECTS WITH SUCH A VEHICLE CAMERA DEVICE

(71) Applicant: Conti Temic microelectronic GmbH, Nuremberg (DE)

(72) Inventor: Dieter Krökel, Eriskirch (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 11 days.

(21) Appl. No.: 15/894,413

(22) Filed: Feb. 12, 2018

(65) Prior Publication Data

US 2018/0167587 A1    Jun. 14, 2018

Related U.S. Application Data

(63) Continuation of application No. PCT/DE2016/200299, filed on Jun. 29, 2016.

(51) Int. Cl.
H04N 7/18        (2006.01)
G06K 9/00        (2006.01)

(52) U.S. Cl.
CPC ......... H04N 7/181 (2013.01); G06K 9/00805 (2013.01)

(58) Field of Classification Search
CPC ....... A61B 5/18; B60K 2370/21; B60L 53/37; B60Q 9/005; B60R 11/04; B60R 1/007; B60R 1/081; H04N 7/181; G06K 9/00805
USPC ....................................................... 348/148
See application file for complete search history.

(56) References Cited

U.S. PATENT DOCUMENTS

2012/0083960 A1*  4/2012  Zhu .................. G05D 1/0214
                                                701/23
2015/0271453 A1*  9/2015  Chuang ............ G08B 13/19619
                                                 348/39

FOREIGN PATENT DOCUMENTS

| DE | 102006016673 A1 | 10/2007 |
| DE | 202010002827 U1 | 7/2010 |
| DE | 102011103378 B3 | 6/2011 |
| DE | 102012001835 A1 | 8/2013 |
| DE | 102013221882 A1 | 4/2015 |
| DE | 102013221878 A1 | 5/2015 |

(Continued)

OTHER PUBLICATIONS

International Search Report and Written Opinion dated Sep. 27, 2016 from corresponding International Patent Application No. PCT/DE2016/200299.

(Continued)

*Primary Examiner* — Jared Walker

(57) ABSTRACT

The invention relates to a vehicle camera device for capturing the surroundings of a motor vehicle, having a first and a second optronic unit, wherein the first and second optronic units each comprise an optical device and an image sensor, wherein the first optronic unit is designed to capture a first detection area and the second optronic unit is designed to capture a second detection area of the surroundings, wherein the first and second optronic units have different image angles with an overlapping section of the detection areas, wherein the overlapping section which is captured by the first optronic unit has a different angular resolution from the rest of the first detection area.

14 Claims, 3 Drawing Sheets

(56) References Cited

FOREIGN PATENT DOCUMENTS

| | | |
|---|---|---|
| DE | 102014215372 A1 | 2/2016 |
| JP | 20140219845 A | 11/2014 |
| WO | 2015062603 A1 | 5/2015 |

OTHER PUBLICATIONS

German Search Report dated Jun. 13, 2016 for corresponding German Patent Application No. 10 2015 215 561.7.
Japanese Notice of Reasons for Refusal dated May 18, 2020 for the counterpart Japanese Patent Application No. 2018-501904.

\* cited by examiner

VEHICLE CAMERA DEVICE FOR CAPTURING THE SURROUNDINGS OF A MOTOR VEHICLE AND DRIVER ASSISTANCE DEVICE FOR DETECTING OBJECTS WITH SUCH A VEHICLE CAMERA DEVICE

CROSS-REFERENCE TO RELATED APPLICATIONS

This application claims the benefit of PCT Application PCT/DE2016/200299, filed Jun. 29, 2016, which claims priority to German Patent Application 10 2015 215 561.7, filed Aug. 14, 2015. The disclosures of the above applications are incorporated herein by reference.

FIELD OF THE INVENTION

The present invention relates to a vehicle camera device for capturing the surroundings of a motor vehicle according to the preamble of claim 1. The invention also relates to a driver assistance device for detecting objects with such a vehicle camera device.

BACKGROUND OF THE INVENTION

Driver assistance devices with one or more cameras are used for evaluating the surroundings of a motor vehicle, by way of example for evaluating lanes, traffic signs, stoplights and other road users. The cameras generally serve for image capture from the area in front of the motor vehicle in the direction of travel. Such cameras typically have an aperture angle of approximately 40-45 degrees.

Future applications such as detection of road users at junctions or stoplight detection when waiting at the front of the line require the largest possible aperture angle, also known as the horizontal image angle, to be able to detect objects in the peripheral area of the image as these are approached. In contrast, highly-automated driving, by way of example, calls for the detection of objects and road structures at a great distance as well, meaning that sufficient angular resolution is required.

From published application DE 10 2011 103 378 B3 a monitoring device is known with cameras, each of which has a plurality of image sensors, configured such that they each scan different areas of a scene with a variable object distance. The image sensors are in each case equipped with an optical device, which independently of the object distance provides the same resolution, and wherein the image sensors, which are intended for different object distances, have objects with different fixed focal lengths.

SUMMARY OF THE INVENTION

The object of the invention is to propose an improved vehicle camera device, allowing the detection of surroundings of the motor vehicle with the largest possible detection area and a sufficient angular resolution for detecting objects.

The object is achieved by a vehicle camera device with the features of claim 1 and by a driver assistance device with the features of claim 12. Advantageous or preferred embodiments of the invention are indicated by the dependent claims, the following description and the figures.

According to the invention, therefore, a vehicle camera device for capturing the surroundings of a motor vehicle is proposed. The surroundings involved are, in particular, those in front of the motor vehicle. The vehicle camera device may preferably be integrated with or connected to a driver assistance device, wherein the driver assistance device is configured in particular for detecting objects from the image data provided by the vehicle camera device. The vehicle camera device is preferably a camera to be arranged in the passenger compartment of the motor vehicle behind the windshield and aligned in the direction of travel.

In order to capture the surroundings, the vehicle camera device comprises a first and a second optronic unit. The first and the second optronic units each comprise an optical device for projection of light and at least or precisely one image sensor for detecting the light projected by the optical device. The optical devices of the first and second optronic unit are preferably configured with a fixed focal length. By way of example, the first and the second optronic unit are arranged together in a housing of the vehicle camera device. The integration of the two optronic units in the housing of the vehicle camera device achieves a compact, space-saving construction for the arrangement in the motor vehicle. The first and the second optronic units are preferably arranged in the same line of sight directly against each other, in particular alongside or on top of one another. Here, directly means at a distance running transversally to the line of sight of, by way of example, a maximum of ten centimeters, in particular a maximum of five centimeters, especially a maximum of one centimeter. Particularly preferably, the optical axes of the first and second optronic units run parallel to one another.

The first optronic unit is configured to capture a first detection area and the second optronic unit a second detection area of the surroundings. In particular, the image sensor and the optical device of the respective optronic unit together specify a horizontal and a vertical image angle, wherein the horizontal and vertical image angle span the detection area. In particular, the vehicle camera device is configured so that the first and the second detection area may be captured and processed independently of one another and/or transmitted as image data independently of one another to the driver assistance device for detecting objects.

The image angles of the first and the second optronic units are different in size. Particularly preferably, the horizontal image angle of the first and the second optronic units are different in size, so that the detection areas differ in particular in the horizontal direction. Alternatively, or optionally, the vertical image angles of the first and second optronic units are different in size, so that the detection areas differ in the vertical direction. The different-sized image angles of the detection areas allow the capture of objects in various areas of the surroundings of the motor vehicle with just one vehicle camera device.

The detection areas captured by the first and the second optronic units have an overlapping section. The overlapping section is thus an area of overlap of the first and second detection area. In particular, the same area of surroundings is imaged in the overlapping section captured by the first and second optronic units. In other words, the overlapping section of the first and second detection area is in each case an image section with the same image content. The overlapping sections captured by the first and second optronic units preferably have the same horizontal and/or vertical image angle, alternatively or optionally in each case also the same focal length.

The first optronic unit is designed such that the overlapping section captured by the first optronic unit has a different angular resolution, particularly preferably a reduced angular resolution, than in the rest of the first detection area. Thus, in the overlapping section, compared to the rest of the first detection area captured by the first optronic unit, a different angular resolution is implemented. For the different angular resolution, the structural design, by way of example, provides that the image sensor in the area capturing the overlapping section has a different, in particular lower, resolution than in the rest of the capturing area. This design has the advantage that a structurally simple and thus low-cost optical device with a constant angular resolution may be used. As an exemplary alternative, it may likewise be provided that the image sensor has a uniform pixel/cm resolution and the optical device is configured so that in the overlapping section a different angular resolution than in the rest of the first detection area is achieved.

Due to the overlap of the detection areas, a surrounding area is covered twice, so that it is possible for the object detection to evaluate just one of the two detection areas. Against this background, the different, in particular reduced, angular resolution in the overlapping section has the advantage that the calculation effort for processing the first detection area is limited to what is necessary. Capture of the rest of the first detection area, in particular with a higher angular resolution, on the other hand, allows object detection without, for example, a virtual pixel increase.

At the same time, the overlapping section has the advantage that the first and the second optronic units may be configured with different capture priorities. Thus, by way of example, it is possible to configure the first optronic unit with the largest possible detection area and thus also to capture peripheral areas, as may be necessary at a junction for detection of crossing road users or also for stoplight detection at the front of the line. Conversely, via the second optronic unit, for example a detailed capture in the overlapping section may be implemented, so that captured objects may be detected both at close range, by way of example at a distance of between 1 and 50 meters, and at long range, by way of example at a distance of between 50 and 500 meters. Consequently, with just one vehicle camera device object detection may be achieved both at different distances and in different surrounding areas of the motor vehicle.

According to a preferred development, in the overlapping section captured by the first optronic unit, an angular resolution of a maximum of 10 pixels per degree, in particular a maximum of 5 pixels per degree is implemented. Alternatively, or optionally, in each case in the rest of the first detection area an angular resolution of at least 30 pixels per degree, in particular of at least 40 pixels per degree is also implemented. In this way, the first optronic unit in the overlapping section implements a low, and, in the rest of the first detection area, a high image accuracy. In this way, only sub-areas, which are not captured by the second optronic unit, are provided with a high resolution quality for the object detection.

In a possible concrete implementation of the invention, the overlapping section captured by the first optronic unit is captured with a lower angular resolution than the overlapping section captured by the second optronic unit. In the overlapping section captured by the second optronic unit, an angular resolution of, by way of example, at least 20 pixels per degree, in particular of at least 40 pixels per degree, especially of at least 80 pixels per degree is implemented. In this way, a high image accuracy of the overlapping section is achieved by the second optronic unit.

The structural design is preferably such that the first optronic unit is configured with a larger image angle, especially with a larger horizontal and/or vertical image angle, than the second optronic unit. Consequently, the first optronic unit, compared to the second optronic unit, has a broader detection area. As a result of the larger image angle, objects close to the motor vehicle, especially to the front of the motor vehicle in the lateral and/or upper detection area of the vehicle camera device, such as for example crossing motor vehicles or stoplights in the vicinity of the motor vehicle, may be captured. By way of example, the first detection is captured by the first optronic unit with a horizontal image angle of at least 100 degrees, in particular of at least 120 degrees, especially of at least 130 degrees. Alternatively, or optionally, it is also provided that the first detection area is captured with a vertical image angle of at least 40 degrees, in particular of at least 50 degrees, especially of at least 60 degrees.

In a particularly preferred embodiment, it is provided that the overlapping section captured by the first optronic unit is a central image area and the rest of the first detection area is a marginal image area of the first detection area surrounding the central image area. The central image area is in particular a central subsection of the field of view of the vehicle camera device. The central image area and the marginal image area are preferably arranged concentrically to an optical axis of the first optronic unit. The first optronic unit is in particular configured and/or may be arranged to detect in the central image area the road traffic in front of the motor vehicle itself, such as for example vehicles ahead and in the marginal image area road traffic in the peripheral area such as for example crossing motor vehicles. With this structural design, therefore, the central image area is implemented with a different, especially reduced, image area compared to the marginal image area. Consequently, a high image accuracy is implemented by the first optronic unit in the marginal image area, so that detecting objects such as, for example, the stoplight detection described above, or crossing motor vehicles, is enabled.

In a further particularly preferred design of the invention, the second detection area corresponds to the overlapping section. In other words, with the second detection area exclusively the overlapping section corresponding with the first optronic unit is captured. Particularly preferably, the overlapping section captured by the second optronic unit corresponds to the central image area captured by the first optronic unit. In this way, it is possible for, for example, lanes, traffic signs or motor vehicles ahead at various distances in the central image area to be captured by the second optronic unit with the necessary angular resolution. This allows accurate and robust object detection.

Particularly preferably, the second optronic unit is configured with a horizontal and/or vertical image angle of at least 30 degrees and/or of a maximum of 50 degrees. The narrow image angle is an advantage in that by means of the optical device a bright second detection area is enabled and with a high image accuracy with very little or no aberrations in a low-cost manner. Consequently, object detection at close and far range is achieved in particular without the need for further image processing or correction.

A further object of the invention relates to a driver assistance device for detecting objects from the detection areas of the surroundings of the motor vehicle captured with a vehicle camera device according to the preceding description. In particular, the driver assistance device comprises the vehicle camera device or is connected with this or is integrated into the housing of the vehicle camera device. The objects to be detected preferably involve stoplights, lanes, traffic signs and/or other road users.

The driver assistance device preferably comprises an image evaluation device, wherein the vehicle camera device is connected with the image evaluation device for transmission of captured detection areas. The image evaluation device is in particular configured to evaluate an object contained in the image data transmitted by the vehicle camera device, in particular stoplights, lanes, traffic signs and/or other road users. Here it is, by way of example, possible that the image evaluation device evaluates the first and the second detection area independently of one another. In contrast, it is likewise possible that the vehicle camera device is configured so that the first and second detection area are combined to form an overall image, wherein in particular the overlapping section of the first detection area is replaced by the overlapping section of the second detection area. Where the overall image is intended to be output for display, an interpolation may take place such that the overall image appears without distortion to the viewer.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Further features, advantages and effects of the invention are indicated by the following description of preferred exemplary embodiments of the invention. Here.

DETAILED DESCRIPTION OF THE PREFERRED EMBODIMENTS

Figure 1:
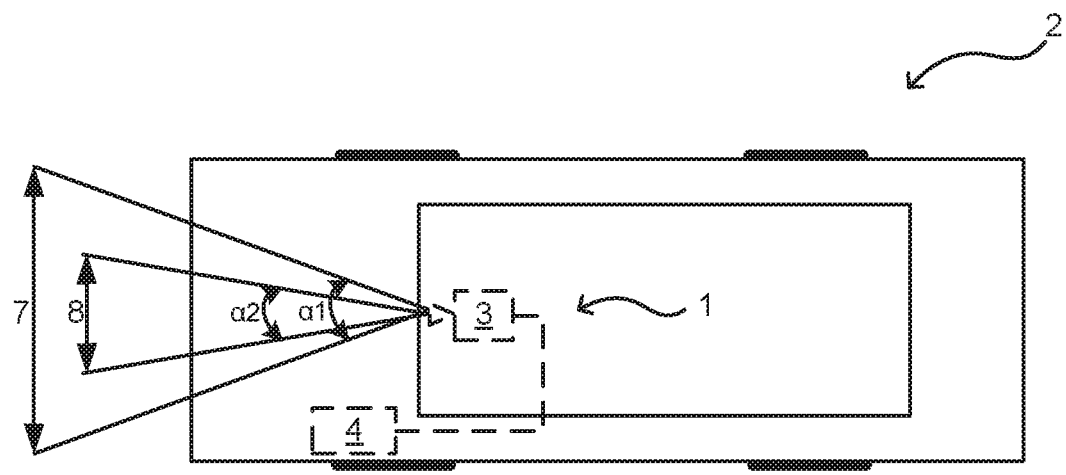
FIG. 1 is a top view of a motor vehicle with a driver assistance device comprising a vehicle camera device.

The following description of the preferred embodiment(s) is merely exemplary in nature and is in no way intended to limit the invention, its application, or uses.

Corresponding parts are given the same reference numerals in all Figures.

A driver assistance system 1 described by way of example in the following and shown in FIG. 1 is arranged in a motor vehicle 2 and comprises a vehicle camera device 3. The vehicle camera device 3 is configured for capturing the surroundings of the motor vehicle 2. The surroundings concerned are at the front of the motor vehicle 2. The vehicle camera device 3 is connected with an image evaluation device 4 of the driver assistance device 1 for transmission of the image data captured. Unlike the schematic representation of FIG. 1, the image evaluation device may be integrated into the housing of the vehicle camera device 3. The image evaluation device 4 is configured to detect objects from the image data transmitted by the vehicle camera device 3 such as by way of example stoplights, lanes and/or traffic signs and to output appropriate output signals.

Figure 2:
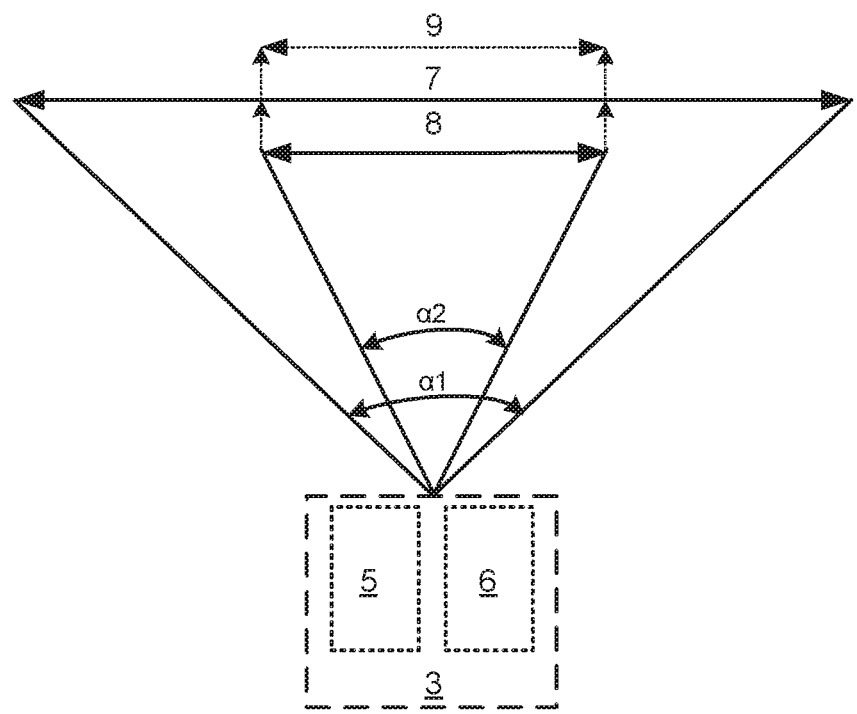
FIG. 2 the vehicle camera device from FIG. 1 for capturing a first and a second detection area.

As shown schematically in FIG. 2, the vehicle camera device 3 comprises a first and a second optronic unit 5, 6, configured to capture the surroundings of the motor vehicle 2. The first and second optronic units 5, 6 each comprise an optical device and an image sensor. By way of example, the first and second optronic units 5, 6 are in each case configured as a mono camera. For an unobtrusive design of the vehicle camera device 3 in the motor vehicle 2, the optronic units 5, 6 are for example arranged together in a housing. As shown here purely schematically, the two optronic units 5, 6 are arranged alongside one another, but it may equally be provided that the two optronic units 5, 6 are arranged one on top of the other.

The first optronic unit 5 is configured to capture a first detection area 7 and the second optronic unit 6 a second detection area 8 of the surroundings. The optical devices of the optronic units 5, 6 are configured differently, so that the detection areas 7, 8 by way of example may be distinguished by their aspect ratio or also by distortions. The first and the second optronic units 5, 6 are configured to capture the detection areas 7, 8 with different horizontal image angles $\alpha 1$, $\alpha 2$. Not shown here, but alternatively or optionally also possible, the detection areas 7, 8 are captured by the optronic units 5, 6 with different-sized vertical image angles.

The horizontal image angle $\alpha 1$ of the first detection area 7 is configured to be larger than that of the second detection area 8. By way of example, the first detection area 7 is captured with a horizontal image angle $\alpha 1$ of at least 100 degrees. The second detection area 8 is, for example, captured with a horizontal image angle $\alpha 2$ of a maximum of 50 degrees. Therefore, in the first detection area 7 a larger area of surroundings is imaged than in the second detection area 8. In view of the different-sized image angle a structural design of the optronic units 5, 6 is possible which in the detection areas 7, 8 achieves object detection at various distances and in various areas of surroundings.

The first and the second detection areas 7, 8 have an overlapping section 9. The overlapping section 9 therefore concerns an area of intersection of the two detection areas 7, 8. In the overlapping section 9 of the detection areas 7, 8 in particular the same area of surroundings is imaged. Whereas the overlapping section 9 of the first detection area 7 relates merely to a sub-area of the first detection area 7, the second detection area 8 forms the overlapping section 9. Thus, the vertical and the horizontal image angle $\alpha 2$ of the second detection area 8 corresponds to the vertical and horizontal image angle $\alpha 2$ of the overlapping section 9.

In this exemplary embodiment, the overlapping section 9 captured by the first optronic unit 6 is a central image area and the rest is a marginal image area of the first detection area 7 surrounding the central image area. The first optronic unit 6 is, by way of example, configured and/or arranged to capture in the central image area the road traffic ahead, such as for example motor vehicles ahead, and in the marginal image area the road traffic in the peripheral area, such as for example motor vehicles crossing the motor vehicle 2 itself.

For detecting objects in the overlapping section 9, with this exemplary embodiment in the central image area the evaluation of just one of the overlapping sections 9 captured by the detection areas 7, 8 is necessary. Against this background, it is provided that the overlapping section 9 of the second detection area 8 is evaluated for the object detection. The evaluation of this overlapping section 9 is advantageous, since the second detection area 8 has a smaller horizontal image angle $\alpha$ than the first detection area 7. The narrow image angle has the advantage that through the second optronic unit 6 in the overlapping section 9 a high image accuracy with little or no distortions is enabled.

Figure 3:
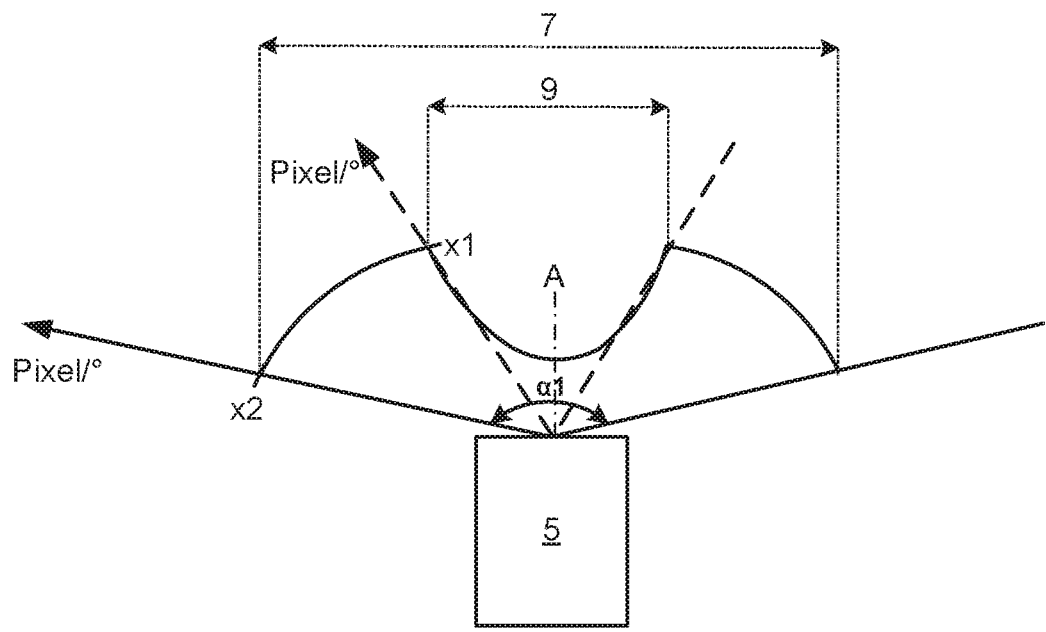
FIG. 3 a schematic representation of the angular resolution of the first detection area from FIG. 2 applied to the horizontal image angle.

In FIG. 3, the detection area 7 captured by the first optronic unit 5 is shown with the horizontal image angle α1. Since for object detection the overlapping section 9 captured by the second optronic unit 6 is evaluated, the first optronic unit 5 is configured to capture the overlapping section 9, here the central image area, with a lower angular resolution than in the rest of the area, here the marginal image area. Thus, the detection area 7 is captured by the first optronic unit 5 with an asymmetrical angular resolution. In this way, on the one hand for the object detection in the marginal image area an adequate angular resolution is ensured, and on the other the image processing effort for the first detection area 7 is reduced.

The first optronic unit 5 is, by way of example, configured so that an angular resolution x1 of the overlapping section 9 increases, starting from an optical axis A of the first optronic unit 5 as far as the marginal image area, in a rotationally symmetrical manner. In this exemplary embodiment, the first optronic unit 5 is configured in such a way that the angular resolution x1 of the overlapping section 9 increases exponentially, starting from the optical axis A of the first optronic unit 5 as far as the transition to the marginal image area, along the horizontal image angle α1. Possible exemplary alternatives may similarly be provided so that the angular resolution x1 increases linearly, starting from the optical axis A as far as the transition to the marginal image area, or does not experience any increase as far as the transition to the marginal image area. For example, a minimum value of the angular resolution x1 or the angular resolution x1 for the transition section 9 is five pixels per degree.

The first optronic unit 5 is also configured to capture the marginal image area with an evenly distributed angular resolution x2. By way of example, the angular resolution x2 of the marginal image area is 20 pixels per degree, so that sharp imaging of the marginal image area is implemented.

Figure 4:
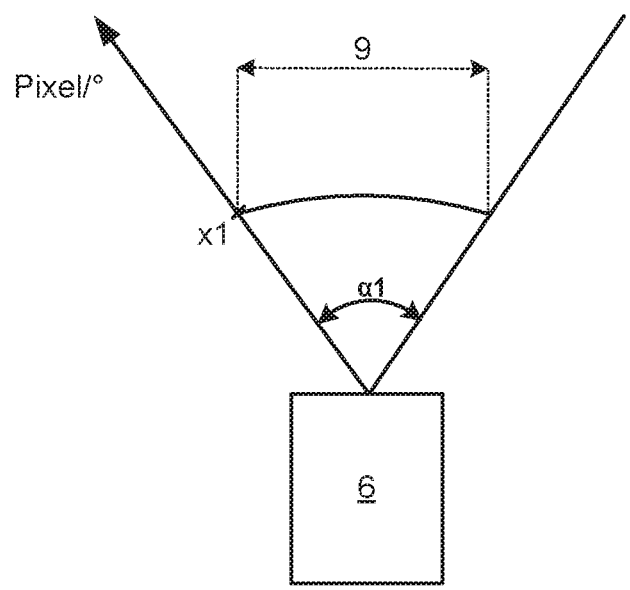
FIG. 4 a schematic representation of an angular resolution of the second detection area from FIG. 2 applied to a horizontal image angle.

In FIG. 4, the detection area 8 captured by the second optronic unit 6 is shown with the horizontal image angle α2. The second optronic unit 6 is configured to capture the second detection area 8, which forms the overlapping section 9, with a uniformly distributed angular resolution x1. By way of example, the angular resolution x1 of the overlapping section 9 is 40 pixels per degree. In this way a sharp imaging of the overlapping area 9 and consequently reliable object detection in the central image area are enabled. In this way, objects in the central image area both at close range, e.g. motor vehicles ahead, and far range, such as for example, street signs, may be detected.

Figure 5:
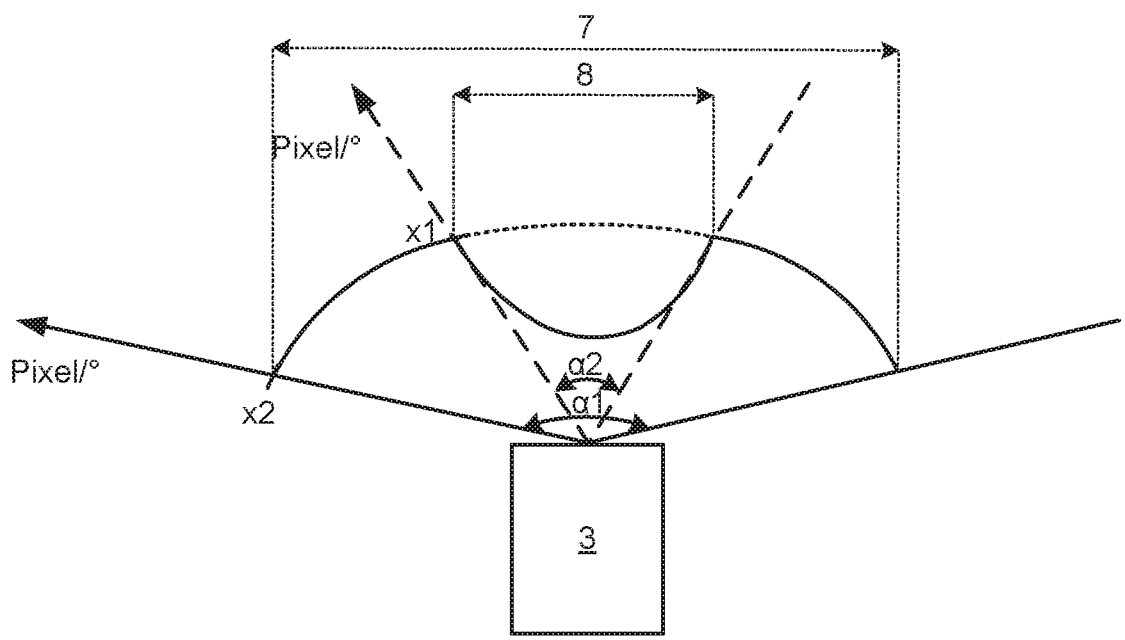
FIG. 5 a schematic representation of the angular resolution of the first and second detection area from FIG. 2 applied to the horizontal image angle.

In FIG. 5, the detection areas 7, 8 captured by the first and the second optronic units 5, 6 are shown with the horizontal image angles α1, α2. In this exemplary embodiment the angular resolution x2 of the marginal image area of the first detection area 7 corresponds to the angular resolution x2 of the second detection area 8. Since the second detection area 8 has a smaller horizontal image angle α than the first detection area 7, in this way the image processing effort is lower compared to the first detection area 7. Alternatively, however, it may likewise be provided that the second detection area 8 has a higher angular resolution x1 than the marginal image area of the first detection area 7. In this way, on the one hand sufficient angular resolution x2 for the marginal image area, and on the other a high angular resolution x1 for the central image area are enabled. Consequently, while a greater calculation effort is needed for the second detection area 8, due to the narrow horizontal image angle it is feasible, so that detailed object detection in the central image area is obtained. This is, by way of example, an advantage when detecting objects in the far range of more than 200 meters.

The description of the invention is merely exemplary in nature and, thus, variations that do not depart from the gist of the invention are intended to be within the scope of the invention. Such variations are not to be regarded as a departure from the spirit and scope of the invention.

LIST OF REFERENCE NUMERALS

1 Driver assistance device
2 Motor vehicle
3 Vehicle camera device
4 Image evaluation device
5 First optronic unit
6 Second optronic unit
7 First detection area
8 Second detection area
9 Overlapping section
x1 Angular resolution of the overlapping section
x2 Angular resolution of the marginal image areas
α1 Horizontal image angle of the first optronic unit
α2 Horizontal image angle of the second optronic unit
A Optical axis of the first optronic unit

What is claimed is:

1. A vehicle camera device for capturing the surroundings of a motor vehicle, comprising:
a first optronic unit having an optical device and an image sensor;
a second optronic unit having an optical device and an image sensor;
a first detection area, the first optronic unit designed to capture the first detection area;
a second detection area, the second optronic unit designed to capture a second detection area of the surroundings; and
an overlapping section, the first and the second optronic units have different image angles with the overlapping section of the detection areas;
wherein the overlapping section captured by the first optronic unit has a different, reduced angular resolution from the rest of the first detection area; and
wherein the overlapping section captured by the first and second optronic units have the same horizontal and/or vertical image angle.

2. The vehicle camera device of claim 1, wherein the overlapping section captured by the first optronic unit has a lower angular resolution than in the rest of the first detection area.

3. The vehicle camera device of claim 1, wherein in the overlapping section captured by the first optronic unit, an angular resolution of a maximum of 10 pixels per degree is implemented.

4. The vehicle camera device of claim 1, wherein the overlapping section captured by the first optronic unit is captured with a lower angular resolution than the overlapping section captured by the second optronic unit.

5. The vehicle camera device of claim 1, wherein in the overlapping section captured by the second optronic unit an angular resolution of at least 20 pixels per degree is implemented.

6. The vehicle camera device of claim 1, wherein the first optronic unit is configured with a larger image angle than the second optronic unit.

7. The vehicle camera device of claim 1, wherein the first optronic unit is configured with a horizontal image angle of at least 80 degrees.

8. The vehicle camera device of claim 1, wherein the overlapping section captured by the first optronic unit has a central image area and the rest is a marginal image area of the first detection area surrounding the central image area.

9. The vehicle camera device of claim 1, wherein the second detection area corresponds to the overlapping section.

10. The vehicle camera device of claim 1, wherein the second optronic unit is configured with a horizontal image angle of at least 20 degrees and/or of a maximum of 50 degrees.

11. A driver assistance system, comprising:
   a vehicle camera device, further comprising:
      a first optronic unit having an optical device and an image sensor;
      a second optronic unit having an optical device and an image sensor;
      a first detection area, the first optronic unit designed to capture the first detection area;
      a second detection area, the second optronic unit designed to capture a second detection area of the surroundings; and
      an overlapping section, the first and the second optronic units have different image angles with the overlapping section of the detection areas;
   wherein the overlapping section captured by the first optronic unit has a different, reduced angular resolution from the rest of the first detection area; and
   wherein the overlapping section captured by the first and second optronic units have the same horizontal and/or vertical angle.

12. The driver assistance system of claim 11, wherein the driver assistance system detects objects from the detection areas of the surroundings of the motor vehicle captured by the vehicle camera device.

13. The driver assistance system of claim 12, wherein the driver assistance device is configured to evaluate objects from the captured detection areas.

14. The driver assistance system of claim 13, the objects from the captured detection areas being selected from the group consisting of stoplights, lanes, traffic signs, and other road users.

* * * * *